United States Patent [19]

Mottus

[11] 3,863,014

[45] Jan. 28, 1975

[54] HIGH ACRYLONITRILE TERPOLYMER CONTAINERS AND PACKAGES

[75] Inventor: Edward H. Mottus, Ballwin, Mo.

[73] Assignee: Monsanto Company, St. Louis, Mo.

[22] Filed: Nov. 8, 1972

[21] Appl. No.: 304,591

[52] U.S. Cl. .............. 426/106, 215/1 C, 260/80.76, 260/4 AR, 260/887, 260/890, 260/897, 260/898, 426/397, 206/84

[51] Int. Cl. ... B65d 5/00, B65d 31/00, B65d 23/00, C08f 15/40, C08f 17/00

[58] Field of Search .................. 260/80.76; 215/1 C; 426/106; 206/84

[56] References Cited

UNITED STATES PATENTS

| | | | |
|---|---|---|---|
| 2,417,293 | 3/1947 | D'Alelio | 260/80.76 X |
| 2,873,212 | 2/1959 | Roeser | 260/80.76 X |
| 3,426,102 | 2/1969 | Solak et al. | 215/1 C |
| 3,451,538 | 6/1969 | Trementozzi | 215/1 C X |
| 3,458,617 | 7/1969 | Isley et al. | 215/1 C |
| 3,540,577 | 11/1970 | Trementozzi et al. | 215/1 C X |
| 3,615,710 | 10/1971 | Lee et al. | 215/1 C X |
| 3,671,607 | 6/1972 | Lee | 215/1 C X |
| 3,720,339 | 3/1973 | Khetani | 215/1 C |
| 3,722,725 | 3/1973 | Khetani et al. | 215/12 R X |

FOREIGN PATENTS OR APPLICATIONS

| | | | |
|---|---|---|---|
| 1,185,305 | 3/1970 | Great Britain | 426/415 |
| 663,268 | 12/1951 | Great Britain | 426/415 |

*Primary Examiner*—Frank W. Lutter
*Assistant Examiner*—Steven L. Weinstein
*Attorney, Agent, or Firm*—William J. Farrington; Eugene Zagarella, Jr.

[57] ABSTRACT

Disclosed herein are oriented containers for food, beverages, and medicines wherein the container is the interpolymerization product of A. 65 to 78% by weight of acrylonitrile;
B. from 3 to 10% by weight of an alkyl vinyl ether wherein the alkyl group contains from 1 to 2 carbon atoms;
C. from 12 to 32% by weight of styrene.

These containers exhibit improved toughness and good barrier properties.

8 Claims, No Drawings

HIGH ACRYLONITRILE TERPOLYMER CONTAINERS AND PACKAGES

BACKGROUND OF THE INVENTION

1. Field of the Invention

The present invention relates to containers for food, beverages, medicines and other related substances. More particularly, the present invention relates to containers prepared from oriented polymeric materials wherein the containers exhibit good toughness and barrier properties.

2. Description of the Prior Art

Polymeric packaging materials are well known in the prior art. The most noteable of these are polyethylene, polypropylene, polyvinyl chloride and polystyrene. In recent years polymeric materials prepared from a major amount of nitrile monomers such as acrylonitrile and methacrylonitrile have significantly advance the state of the packaging art. These high nitrile packaging materials, which are disclosed in U.S. Pat. Nos. 3,451,538 and 3,540,577, among others, have been found to exhibit superior barrier properties to oxygen and water vapor. Consequently, these materials have achieved special significance in the packaging of food, beverages, medicines and other related substances which are adversely affected by even small amounts of oxygen and water vapor.

In addition to requiring good oxygen and water vapor barrier properties, certain packaging applications require that the polymeric material have a high degree of toughness and be readily oriented. Moreover, other packaging applications involving carbonated beverages may require good carbon dioxide barrier properties in order to preserve a high degree of carbonation in the beverage upon storing.

The present invention fulfills a need in the prior art by providing containers with improved properties. These oriented containers are especially useful in the packaging of carbonated beverages.

SUMMARY OF THE INVENTION

The present invention solves some of the problems encountered in the prior art by providing oriented containers for food, beverages and medicines, wherein the containers have a tensile impact of at least 600 inch-pounds/square inch at 73°F. and an oxygen permeability of less than 10 cc./day 100 sq.in./mil-atmos. at 73°F. and water vapor transmission of less than 4.0 gms./day/100 sq.in./mil-atmos. at 73°F. and 95 percent R.H., wherein the container is the interpolymerization product of A. from 65 to 78% by weight of acrylonitrile (AN);
B. from 4 to 10% by weight of an ethylenically unsaturated alkyl vinyl ether wherein the alkyl group contains from 1 to 2 carbon atoms; and
C. from 12 to 32% by weight of styrene (S).

DESCRIPTION OF THE PREFERRED EMBODIMENTS

The improved containers of the present invention are prepared by interpolymerizing (1) acrylonitrile; (2) methyl vinyl ether and/or ethyl vinyl ether; and (3) styrene to form a polymer having a specific viscosity in the range of from .07 to 0.12 as measured as a 0.1% solution in dimethylformamide (DMF) at 25°C.; orienting the polymer by stretching at a rate of 4 in./sec. to 160 in./sec. and a temperature of 230°F. to 500°F. and thermoforming the polymer at temperature in the range of from 230°F. to 500°F. to form a container.

The alkyl vinyl ether monomers used in the present invention may be represented by the following general formula:

$$H_2C = CH - O - R$$

wherein R is methyl or ethyl (MVE and EVE, respectively).

The amount of acrylonitrile used is in the range of from 65 to 78% by weight based on the total weight of monomers in the interpolymer. Preferably, for maximum tensile impact strength, the amount of acrylonitrile is in the range of from 68 to 74% by weight.

The amount of vinyl ether used is in the range of from 4 to 10% by weight and preferably from 4 to 8% by weight based on the total weight of monomers in the interpolymer. The amount of styrene used is in the range of from 12 to 32% weight and preferably in the range of from 18 to 28% by weight based on the total weight of monomers in the interpolymer.

This invention also comtemplates the use of up to about 25% by weight of a rubber component such as, for example, polybutadiene, butadiene-styrene copolymers, isoprene, neoprene, nitrile rubbers, acrylate rubbers, natural rubbers, interpolymers of butadiene with acrylonitrile, methacrylonitrile, tertiarybutyl styrene, styrene and mixtures thereof such as acrylonitrile-butadiene copolymers, methacrylonitrile-butadiene copolymer, acrylonitrile-styrene-butadiene terpolymers, methacrylonitrile-styrene-butadiene terpolymers, methacrylonitrile-tertiarybutyl styrene-butadiene terpolymers, acrylonitrile-tertiarybutyl styrene-butadiene terpolymers, ethylene-propylene copolymers, chlorinated rubbers, etc., which may be used to strengthen or toughen the materials prepared from the compositions of this invention. This rubbery component may be incorporated into the polymers of this invention by any of the methods which are well known to those skilled in the art, e.g., direct polymerization of monomers, polyblends, grafting the monomer mixture onto the rubbery backbone, physical admixture of the rubbery component, etc.

The polymers used in the practice of this invention may be prepared according to the method well known to those skilled in the art, e.g., by bulk, emulsion, solution or suspension polymerization methods, using conventional polymerization apparatus. They may be prepared at atmospheric, sub-atmospheric or super-atmospheric pressures. When using polymerization methods other than by emulsion techniques, care must be taken to avoid the use of sulfur containing chain transfer agents. Polymerization may be initiated by ionic or by free radical mechanisms. Any free radical generating catalyst may be used including actinic radiation. Preferably, the polymerization reaction is carried out at temperatures in the range of from 0°C. to 120°C. and more preferably from 25°C. to 85°C.

The following test methods are used in the working examples set forth below:

1. Toughness

The toughness of the polymers is measured as a function of the tensile impact which is measured on an Instron testing machine operated at a crosshead speed of 20 inch per min. The standard recording equipment of the instron is replaced by a cathode ray oscillograph and strain gage amplifiers so that the rapid changes in the stress-strain curve can be recorded. The sweep time on the oscillograph is adjusted so that the whole stress-strain curve is produced in the set sweep time and recorded photographically.

Micro tensile test specimens are machined from molded slabs of polymer using a high speed tensile cutter and a jig. The tensile specimen is approximately 2 inches long. The test area is 0.125 inch wide by 0.060 inch thick and the length of the draw area is one-half inch. The area under the stress-strain curve is expressed as inch-pounds/cubic inch. (Stress X strain = work).

$$\text{Stress} = \text{Pounds/in}^2$$

$$\text{Strain} = \Delta \ L/L - \text{in/in}$$

$$\text{Toughness} = (\text{pounds/in}^2) \times \text{in/in} = \text{inch.pounds/cubic inch}$$

2. Specific Viscosity

Specific viscosity is measured as a 0.1% (wt./vol.) solution in dimethyl formamide (DMF) at 25°C.

3. Melt Viscosity

Melt viscosity is determined using a rheometer at 400°F. using a shear rate of 100 reciprocal seconds (sec [116 1]). In order to meet the polymer processability requirements in regard to extrusion and orientation, the polymer should have a melt viscosity of less than 50 K poise.

The following examples are set forth in illustration of the present invention and are not to be construed as limitations thereof. All parts and percentages given are by weight unless otherwise specified.

EXAMPLE 1

This example illustrates the preparation of an acrylonitrile/methyl vinyl ether/styrene terpolymer of the present invention. The polymer is prepared by emulsion polymerization methods using conventional emulsion polymerization apparatus. The following materials are charged to a 5-liter The flask:
2200 milliliters of water (deaerated and distilled)
37.5 grams of sodium lauryl sulfate
20.5 grams $KH_2PO_4$
270 ml NaOH solution (0.1 M nitrogen purged)

The reactor is warmed to 42°C. and the following monomer charge is added to the reactor.

114 grams acrylonitrile (nitrogen purged)
9.3 grams methyl vinyl ether (freshly distilled)
1.25 gram styrene
1.5 ml dodecyl mercaptan Following the initial monomer charge the following delayed catalyst and delayed monomer charges are added continuously to the reaction vessel over a 5 ½ hour period.

Delayed Catalyst Charge
  200 grams of a 5% potassium persulfate solution
  5.5 grams of a 10% sodium bisulfite solution
Delayed Monomer Charge
  1025 grams acrylonitrile (nitrogen purged)
  95 grams methyl vinyl ether (freshly distilled)
  255 grams styrene (distilled under nitrogen)
  20 milliliter dodecyl mercaptan The reaction is terminated immediately upon completion of the delayed monomer addition. The resulting emulsion is coagulated by pouring it into methanol and the polymer is recovered by filtration. The resulting polymer, which is washed thoroughly with water and dried, contains 78% by weight acrylonitrile, 7% by weight methyl vinyl ether and 15% by weight styrene. Test results on this polymer are tabulated in Table 1 below.

EXAMPLES 2 to 6

Further polymers are prepared using the polymerization methods described in Example 1 above. Test results on these polymers along with results for the polymer of Example 1 are tabulated in Table 1 below.

TABLE 1

SUMMARY OF EXAMPLES 1 to 6

| Example | AN/MVE/S | Toughness Inch/lbs./cu.in. | Specific Viscosity | Melt Viscosity (K poise) |
|---|---|---|---|---|
| 1 | 78/7/15 | 680 | .08 | 36 |
| 2 | 77/7/16 | 1050 | .08 | 29 |
| 3 | 76/7/17 | 1500 | .094 | 32 |
| 4 | 73/8/19 | 1600 | .092 | 42 |
| 5 | 71/8/21 | 1350 | .078 | 29 |
| 6 | 65/7/28 | 900 | .087 | 40 |

The data in Table 1 above indicate that the toughness of the terpolymer falls off rapidly when the acrylonitrile content goes outside the preferred range from 68 to 74% by weight. These examples, which are listed in order of decreasing acrylonitrile content, show that maximum toughness is obtained within the preferred region. Note that the melt viscosity for these polymers is well below the maximum limit of 50 which must be observed if the polymer is to have suitable processability.

EXAMPLES 7 to 9

The following examples are set forth to show the use of ethyl vinyl ether in place of the methyl vinyl ether used in Examples 1 to 6. The polymers are prepared according to the general procedures of Example 1. Test results on these examples are tabulated in Table 2 below.

TABLE 2

SUMMARY OF EXAMPLES 7 to 9

| Example | AN/EVE/S | Toughness Inch/lbs./cu.in. | Specific Viscosity | Melt Viscosity K (poise) |
|---|---|---|---|---|
| 7 | 54/7/39 | 600 | .08 | 13 |
| 8 | 63/7/30 | 620 | .126 | 34 |
| 9 | 76/7/17 | 1300 | .094 | 43 |

A comparison of Examples 7 and 8 indicate that there is little change in the toughness of the polymer at an acrylonitrile content of 54% versus 63%. However, at acrylonitrile content of 76%, which is in the preferred range of the present invention, the toughness is almost doubled. Note that the melt viscosity for these polymers is well below the maximum limit of 50 which must be observed if the polymer is to have suitable processability.

EXAMPLES 10 to 14

The following examples illustrate the adverse results that are obtained when various monomers are substituted for the ones required in the practice of the present invention. These examples are prepared according to the general procedures of Example 1, except that the total monomer charge is delayed into the reaction vessel. Test results on these polymers are tabulated in the following Table 3.

TABLE 3

SUMMARY OF EXAMPLES 10 to 14

| Example | | Toughness Inch/lbs./Cu.in. | Specific Viscosity | Melt Viscosity (K poise) |
|---|---|---|---|---|
| 10 | AN/EVE/α-MS 67/ 10/23 | 270 | .083 | 20 |
| 11 | AN/MVE/α-MS 82/ 7 /11 | 90 | .083 | 20 |
| 12 | AN/MAN/MVE/S 60/ 5/ 7 /28 | 300 | .078 | 25 |
| 13 | AN/MAN/MVE/S 60/ 15/ 7 /18 | 140 | .099 | 18 |
| 14 | AN/+-BVE/S 77/ 6 /17 | 215 | 0.122 | 37 |

Referring to Table 3, Examples 10 and 11 illustrate that the substitution of alpha-methyl styrene for styrene at two different acrylonitrile levels results in a significant decrease in toughness. Examples 12 and 13 illustrate that substitution of methacrylonitrile for part of the acrylonitrile also results in a decrease in toughness. Example 14 illustrates that the use of tertiary butyl vinyl ether instead of ethyl or methyl ether also results in a decrease in toughness.

The following examples illustrate that when amount of vinyl ether monomer is in excess of 10% by weight, the terpolymer is less homogeneous. On the other hand, less than 4% by weight vinyl ether monomer readily gives polymers that appear to be homogeneous but are very brittle.

EXAMPLE 15

This example illustrates the preparation of an acrylonitrile/methyl vinyl ether/styrene terpolymer which is prepared by suspension polymerization methods using conventional polymerization apparatus according to the following charge:

Charged to Reactor
900 ml $H_2O$
3.0 grams polyvinyl pyrrolidone

Initial Charge
456 grams acrylonitrile (nitrogen purged)
16 grams methyl vinyl ether (freshly distilled)
4.71 grams styrene (distilled under nitrogen)
6.0 grams azobisisobutyronitrile
4.5 ml dodecyl mercaptan Delayed Monomer Charge
20 grams methyl vinyl ether (freshly distilled)
103.2 grams styrene (distilled under nitrogen)
1.5 ml dodecyl mercaptan The $H_2O$ and polyvinyl pyrrolidone are charged to a 2 liter round-bottom flask and purged with $N_2$ for 30 minutes. The Initial Charge is added and the mixture stirred and heated to 60°C. When the pot temperature reaches 60°C. Delayed Monomer Charge is started in at about 0.7 ml per minute. After 90 minutes conversion of monomer to polymer is 25%. The polymer is analyzed at this point and found to be 68% AN 12% methyl vinyl ether and 20% styrene. Compression moldings of the polymer are hazy suggested that the polymer is not homogeneous.

EXAMPLE 16

In a similar manner another run using the polymerization procedure of Example 1 carried out. The resulting polymer was analyzed at 30% conversion and found to be 72% acrylonitrile, 9% methyl vinyl ether and 19% styrene. This terpolymer gives a clear tough molding that has properties comparable to that obtained in Example 4 above.

EXAMPLE 17

The general polymerization procedure of Example 1 is followed here to give a polymer having the following composition 75% acrylonitrile, 3.5% methyl vinyl ether and 21.5% styrene This polymer gives a clear but very brittle compression molded sheet.

EXAMPLE 18

This example illustrates another process for the preparation of the acrylonitrile/methyl vinyl ether/styrene terpolymers of the present invention. The polymer is prepared by emulsion polymerization methods using conventional emulsion polymerization apparatus.

The following materials are charged to a 1-liter round-bottom flask:
300 milliliters of water (deaerated and distilled)
3.3 grams of sodium lauryl sulfate
0.8 grams $KH_2PO_4$ The reactor is purged with nitrogen for 30 minutes and the following charged is added to the reactor.
10 ml $K_2S_2O_8$ solution (5%)
2 ml $NaHSO_3$ solution (10%)
23.4 grams acrylonitrile (nitrogen purged)
1.35 grams methyl vinyl ether (freshly distilled)
0.25 gram styrene
0.8 ml dodecyl mercaptan The following charges, which are in separate holding vessels are then added continuously over a 2 hour and twenty minute period.

Vessel No. 1
40 grams of a 5% potassium persulfate solution

Vessel No. 2
8 grams 10% $NaHSO_3$ solution

Vessel No. 3
152 grams acrylonitrile (nitrogen purged)
12 grams methyl vinyl ether (freshly distilled)
36 grams styrene (distilled under nitrogen)
1.9 milliliter dodecyl mercaptan The reaction is terminated immediately upon completion of the delayed monomer addition. The resulting emulsion is coagulated by pouring into 2 liters of methanol followed by filtration. The resulting polymer is washed thoroughly with water at 60°-65°C., filtered, washed again, air dried and then dried overnight at 75°C. in a circulating air oven. The resulting polymer contains 76% by weight acrylonitrile, 7% by weight methyl vinyl ether and 17% by weight styrene, and has a specific viscosity of 0.107 and a melt viscosity of 44 K poise.

The physical properties of the polymers of the present invention are improved by orientation which is accomplished by stretching the polymer at a rate of 4 to 160 in./sec. within a limited range of temperatures (230°F. to 350°F.) and then cooling it in the stretched condition. If the stretching temperature is lower than 230°F., necking may occur and voids may be formed. As the stretching temperature is increased further above 350°F., the improvement in mechanical properties becomes smaller for a given degree of stretch (draw ratio). For this reason it is desirable to keep the drawing temperature as low as possible depending on the rate of stretching provided that there is no necking or voiding.

The polymer may be stretched by any suitable process and stretching in two directions may be sequential or simultaneous.

A convenient method for orienting a film in two directions simultaneously is to extrude the molten polymer through an annular orifice to give a tube and to draw the tube lengthwise by flattening it and passing it through two sets of nip rolls, the second rotating faster than the first. The tube is simultaneously stretched by internal gas pressure created within the tube between the two sets of nip rolls. The presence of the first set of nip rolls also prevents the point of expansion moving backwards to a position at which the tube after extrusion is still at a temperature at which flow would occur to the detriment of orientation. Another method is to extrude the film from a slit orifice, cool it and grip each side of the cooled film by a number of pairs of clamps. The clamps are then drawn along a path such that those in each pair diverge laterally from each other and the distance between adjacent pairs is also increased, thus stretching the film laterally and longitudinally. Similarly, bottles and other containers may be oriented by heating the polymer while stretching it and blowing it into the described shape.

Improved containers (bottles, cans, jars, etc.) are obtained by making a multiaxially oriented container having a controlled distribution of wall thickness which comprises extruding the polymers of the present invention to form a parison at a temperature above 375°F. which is the temperature at which substantial molecular orientation occurs. Extrusion is carried out so that the thickness of the parison varies in a controlled manner. The variable wall thickness parison is then exposed to a temperature conditioning medium to bring its temperature to within the range at which substantial molecular orientation can occur, wherein the temperature of the increased thickness portion of the parison is incrementally greater than the thinner portion of the parison. The parison is then elongated to develop uniaxial orientation, said elongating causing the thickened parison portion to stretch more than the thinner portion such that the wall thickness of the thicker portion is reduced and approaches that of the thinner portion. The elongated parison is then expanded radially outwardly against the walls of a cavity of a blow mold corresponding to the configuration of the container to develop radial orientation and form the container.

EXAMPLES 19 to 21

In order to illustrate the good packaging properties of the polymers of the present invention, the polymers from examples 1 and 2 are tested for taste, water vapor and oxygen barrier properties.

Oxygen Permeability — the oxygen permeability test is run on a flattened sample according to ASTM D-1434-58. More specifically, a 3 inch diameter disc is severed from the 4 inch X 6 inch sample and clamped around its outer margin within a permeability cell such that the chamber within the cell is divided by the sample into two chamber portions which have been evacuated of all residual gases and vapors. One of these chamber portions is filled with an atmosphere (760 mmHg) of pure, dry oxygen and the chamber portion on the opposite side of the disc is maintained under vacuum. After reaching equilibrium and after 24 hours under these conditions at a temperature of 73°F., the amount of oxygen passing through the disc is measured (by pressure) and the oxygen permeability rate is calculated in terms of cc./day/100 sq.in./mil-atm at 73°F.

Water Vapor Permeability — water vapor permeability of the polymer is the capability of the polymer to transfer moisture from the vapor state through the polymer and is measured according to the method outlined in ASTM E-96-63T. Briefly, a container is filled with calcium chloride desiccant, sealed with a moisture impermeable closure and weighed. The sealed container is then place in a chamber containing an atmosphere of circulating air at 95 percent relative humidity and 100°F. for 28 days or more after which the container and contents are reweighed. The results are used to calculate the Water-Vapor Transmission Rate (WVTR) in terms of grams/day/100 sq.in./mil at 100°F. (95 percent RH).

Taste Transfer — A 10 ounce oriented container made from the polymer to be tested is filled with a carbonated cola drink and sealed. The container is then stored at 73°F. (50 percent RH) for 1, 2, 3 and 6 month periods. At the same time, control containers made of glass and metal are also stored under the same conditions. After each of the four storage periods, the cola beverage are tasted by a well-trained expert taste-panel of at least five persons, and the taste of the beverages is compared to that stored in the controls. Twenty taste determinations are made; if 10 or less of the determinations indicate a taste difference versus the control, the taste transfer is considered to be non significant; if eleven through 15 of the determinations indicate a taste difference versus the control, there is considered to be some taste transfer which is unacceptable; if 16 through 20 indicate a difference, the taste transfer is considered to be very much and is also unacceptable.

TABLE 4

SUMMARY OF PACKAGING TEST RESULTS FOR EXAMPLES 19-20

| Example | Polymer from Example | Water Vapor Permeability | Oxygen Permeability | Taste Test |
| --- | --- | --- | --- | --- |
| 19 | 1 | 1.2 | 0.6 | Pass |
| 20 | 2 | 1.7 | 0.8 | Pass |

The data in the foregoing Table 4 clearly show the good packaging properties which are obtained with the polymers of the present invention.

The present invention comtemplates the use of dyes, pigments, stabilizers, processing aids, etc. in combination with the polymers of the present invention.

From the foregoing it should be apparent that many variations may be made in the present invention without departing from the spirit and scope thereof.

What is claimed is:

1. An oriented molded container for food, beverages and medicines, having a tensile impact of at least 600 inch-pounds/square inch at 73°F. and an oxygen permeability of less than 10 cc./day/100 sq.in./mil-atmos. at 73°F. and water vapor transmission of less than 4.0 gms./day/100 sq.in./mil-atmos. at 73°F. and 95 percent R.H., wherein the container is the interpolymerization product of A. from 65 to 78% by weight of acrylonitrile;

B. from 4 to 10% by weight of an alkyl vinyl ether wherein the alkyl group contains from 1 to 2 carbon atoms; and C. from 12 to 32% by weight of styrene.

2. An oriented container as in claim 1 wherein the alkyl vinyl ether is methyl vinyl ether.

3. An oriented container as in claim 1 wherein the alkyl vinyl ether is ethyl vinyl ether.

4. An oriented container as in claim 1 wherein the acrylonitrile content is in the range of from 68 to 74% by weight and the vinyl ether content is in the range of from 4 to 8% by weight.

5. An oriented container as in claim 1 which is the form of a bottle.

6. An oriented container as in claim 1 which is in the form of a jar.

7. Food beverages, or medicines packaged in an oriented molded container having a tensile impact of at least 600 inch-pounds/square inch at 73°F. and an oxygen permeability of less than 10 cc./day/100 sq.in./mil-atmos. at 73°F. and water vapor transmission of less than 4.0 gms/day/100 sq.in./mil-atmos. at 73°F. and 95 percent R. H., wherein the container is the interpolymerization product of A. from 65 to 78% by weight of acrylonitrile;

B. from 4 to 10% by weight of an alkyl vinyl ether wherein the alkyl group contains from 1 to 2 carbon atoms; and C. from 12 to 32% by weight of styrene.

8. A carbonated beverage packaged in an oriented molded container having a tensile impact of at least 600 inch-pounds/square inch at 73°F. and an oxygen permeability of less than 10 cc./day/100 sq.in./mil-atmos. at 73°F. and water vapor transmission of less than 4.0 gms/day/100 sq.in./mil-atmos. at 73°F. and 95 percent R.H., wherein the container is the interpolymerization product of A. from 65 to 78% by weight of acrylonitrile;

B. from 4 to 10% by weight of an alkyl vinyl ether wherein the alkyl group contains from 1 to 2 carbon atoms; and C. from 12 to 32% by weight of styrene.

* * * * *